Patented June 1, 1943

2,320,851

UNITED STATES PATENT OFFICE 2,320,851

PROCESS OF DEPOLYMERIZING OLEFINIC POLYMERS

Paul L. Cramer, Highland Park, Mich., assignor to General Motors Corporation, Detroit, Mich., a corporation of Delaware No Drawing. Application October 6, 1941, Serial No. 413,825

8 Claims. (Cl. 260—683)

This invention relates to a process of depolymerizing olefinic polymers.

It is old to depolymerize, usually by means of heat alone, polymers of conjugated dienes, such as rubber or dicyclopentadiene. So far as I am aware, however, the depolymerization of the more stable polymers of the mono-olefins has not been successfully carried out prior to my invention.

I have discovered that olefinic polymers, especially such polymers as the olefinic polymers of the mono-olefins, may be readily depolymerized at elevated temperature in the presence of a catalyst. The catalyst which I have found effective is anhydrous aluminum sulfate. It may be prepared by heating C. P. hydrated aluminum sulfate $(Al_2(SO_4)_3 \cdot 18\ H_2O)$ to a temperature on the order of 350° to 400° C. in a current of dry air.

The temperature at which the reaction can be carried out may vary considerably. In vapor phase reactions, temperatures of about 250° to 400° C. are contemplated.

The following may be given as typical examples of procedure in accordance with the invention:

Diisobutylene in liquid form was passed slowly into a 1" O. D. Pyrex tube packed for a length of 30" with anhydrous aluminum sulfate maintained at a temperature of 285° C. The diisobutylene promptly vaporized when it came in contact with the heated catalyst and thereupon the vapor passed through the Pyrex reaction tube and catalyst therein. The reaction product resulting from this vapor phase reaction was collected at —50° C. and fractionated in a low temperature fractionating column. It was found that in one passage over the catalyst 62% of the diisobutylene was converted to isobutylene. The residue consisted of 88% unchanged diisobutylene, and 10% higher boiling hydrocarbons.

Under conditions similar to those given above for depolymerizing diisobutylene, dimers of t-butylethylene were depolymerized to an equilibrium mixture of three hexenes.

Various changes and modifications of the embodiments of my invention described herein may be made without departing from the principle and spirit of my invention.

I claim:

1. The process of depolymerizing olefinic polymers which includes treating said polymer at elevated temperature in the presence of dehydrated aluminum sulfate.

2. The process of depolymerizing olefinic polymers which includes treating said polymer in the vapor phase at a temperature on the order of 250°–400° C. in the presence of anhydrous aluminum sulfate.

3. The process of depolymerizing polymers of the mono-olefins which includes treating said polymer at elevated temperature in the presence of anhydrous aluminum sulfate.

4. The process of depolymerizing diisobutylene to form isobutylene which includes treating the diisobutylene at a temperature of about 250°–400° C. in the presence of anhydrous aluminum sulfate.

5. The process of depolymerizing dimers of t-butylethylene which includes treating said dimers at a temeprature of about 250°–400° C. in the presence of anhydrous aluminum sulfate.

6. The process of depolymerizing polymers of the mono-olefins which includes treatment of said polymers at a temperature of about 250°–400° C. in the presence of anhydrous aluminum sulfate.

7. The process of depolymerizing polymers of the mono-olefins which includes vapor phase treatment of said polymers at a temperature of about 250°–400° C. in the presence of anhydrous aluminum sulfate.

8. The process of depolymerizing diisobutylene which includes passing diisobutylene in the vapor phase over anhydrous aluminum sulfate heated to a temperature of about 285° C.

PAUL L. CRAMER.